United States Patent
Kou

(10) Patent No.: US 8,945,311 B2
(45) Date of Patent: Feb. 3, 2015

(54) METHOD FOR CLEANSING GLASS SUBSTRATE OF TFT-LCD

(75) Inventor: Hao Kou, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 335 days.

(21) Appl. No.: 13/508,983

(22) PCT Filed: Mar. 28, 2012

(86) PCT No.: PCT/CN2012/073161
§ 371 (c)(1),
(2), (4) Date: May 9, 2012

(87) PCT Pub. No.: WO2013/139047
PCT Pub. Date: Sep. 26, 2013

(65) Prior Publication Data
US 2013/0239987 A1    Sep. 19, 2013

(30) Foreign Application Priority Data

Mar. 19, 2012    (CN) .......................... 2012 1 0072893

(51) Int. Cl.
*B08B 3/12*    (2006.01)
(52) U.S. Cl.
USPC .............................................. 134/1.3; 134/1
(58) Field of Classification Search
None
See application file for complete search history.

(56) References Cited

U.S. PATENT DOCUMENTS

| 5,865,199 A | * | 2/1999 | Pedziwiatr et al. | ............ 134/184 |
| 2006/0213542 A1 | * | 9/2006 | Abiko et al. | .................... 134/61 |
| 2007/0207710 A1 | * | 9/2007 | Montierth et al. | .............. 451/56 |

FOREIGN PATENT DOCUMENTS

| CN | 101884986 A | | 11/2010 |
| JP | 09199464 A | * | 7/1997 |
| JP | 2001340820 A | * | 12/2001 |

OTHER PUBLICATIONS

English Machine Translation of JP 2001-340820 A.*
English Machine Translation of JP 09-199464 A.*

* cited by examiner

*Primary Examiner* — Nicole Blan
(74) *Attorney, Agent, or Firm* — Cheng-Ju Chiang

(57) ABSTRACT

The present invention provides a method for cleansing a glass substrate of a TFT-LCD, includes the following steps: providing an ultrasonic cleansing machine, a glass substrate in-feeding conveyor, and a glass substrate out-feeding conveyor, wherein the ultrasonic cleansing machine includes a cleansing tank, a cleansing liquid contained in the cleansing tank, and first and second ultrasonic frequency generators arranged in the cleansing tank and having different frequencies; conveying a glass substrate with the glass substrate in-feeding conveyor into the cleansing tank; immersing the glass substrate in the cleansing liquid of the cleansing tank; generating ultrasonic waves of different frequencies with the first and second ultrasonic frequency generators to be applied to the cleansing liquid to effect ultrasonic cleansing of the glass substrate; and conveying the cleansed glass substrate out of the cleansing tank with the glass substrate out-feeding conveyor.

5 Claims, 3 Drawing Sheets

METHOD FOR CLEANSING GLASS SUBSTRATE OF TFT-LCD

BACKGROUND OF THE INVENTION

1. Field of the Invention

The present invention relates to the field of liquid crystal displaying, and in particular to a multi-frequency ultrasonic cleansing method for a glass substrate of a TFT-LCD (Thin-Film Transistor Liquid Crystal Display).

2. The Related Arts

In a manufacture process of a TFT-LCD, when particles that have a size of around ⅓ of line width exist on a surface of a glass substrate, the occurrence of defects of for example short line or shorting becomes more frequent. To overcome such a problem, after a surface of a glass substrate has been processed by supplying a predetermined processing liquid, a cleansing operation is carried out on the glass substrate.

A conventional process that is currently adopted in the TFT-LCD industry to cleanse glass substrates is as follows. Plasma cleansing or extreme ultraviolet (EUV) cleansing or deep ultraviolet (DUV) cleansing is first applied, bushing, showering, and jet cleansing are then taken, and finally, two-fluid cleansing is carried out. The substances removed by these processes are respectively organic remains and particles and the sizes of the particles removed by these processes are respectively more than 10 μm, 1-10 μm, and 1-5 μm.

With the technical development trend of enlarged panel size, increased aperture ratio, and low line width, removing particles of various sizes by using the conventional machines shows the following drawbacks:

(1) Multiple machines must be used to respectively remove particles of different sizes and this requires a high expenditure for the machines and further, time is waste for substrates may be transferred among various machines and new particles may be introduced during the transfer of the substrates; and (2) The generally principle of cleansing carried out by the machines is physical flushing, which gives no good result for cleansing particles having smaller size and securely stuck to the substrate and further, these cleansing operations use a large amount of distilled water and added solvents, leading to an increase of cost.

To improve the result of cleansing, ultrasonic cleansing is increasingly applied in the manufacture process of TFT-LCD. Ultrasonic cleansing is a cleansing process that is applied to the fields of precision machinery and specific precision mechanism. The ultrasonic cleansing uses cavitation effect induced by ultrasonic waves. Cavitation is implosion of tiny bulbs in a solution and is induced by variation of pressure within an ultrasonic field. Pressure difference is caused by alternation of positive and negative pressures in a liquid zone. When the liquid is in negative pressure, the boiling point is lowered, making it generating a number of tiny vapor bulbs. When the pressure turns positive, violent implosion occurs in the tiny bulbs. High frequency electrical energy released from a transducer generates mechanical waves. Such a cavitation phenomenon provides an effect of mechanical stirring and cleansing. The application of ultrasonic cleansing technique, to quite an extent, improves the result of cleansing a glass substrate of TFT-LCD. However, machines of different frequencies must be used for removal of particles of different sizes. This leads to a high expenditure of machine cost. Further, transferring substrates among various machines is a waste of time and may introduce new particles during the transfer process.

SUMMARY OF THE INVENTION

An objective of the present invention is to provide a method for cleansing a glass substrate of a TFT-LCD, which has a low cost, wide cleansing range, and great cleansing power.

To achieve the objective, the present invention provides a method for cleansing a glass substrate of a TFT-LCD, which comprises the following steps:

Step 1: providing an ultrasonic cleansing machine, a glass substrate in-feeding conveyor, and a glass substrate out-feeding conveyor, wherein the ultrasonic cleansing machine comprises a cleansing tank, a cleansing liquid contained in the cleansing tank, and a plurality of first ultrasonic frequency generators and a plurality of second ultrasonic frequency generators that are arranged in the cleansing tank, the first ultrasonic frequency generators and the second ultrasonic frequency generators having different frequencies;

Step 2: conveying a glass substrate to be cleansed with the glass substrate in-feeding conveyor into the cleansing tank;

Step 3: immersing the glass substrate to be cleansed in the cleansing liquid of the cleansing tank;

Step 4: generating ultrasonic waves of different frequencies with the first and second ultrasonic frequency generators to be applied to the cleansing liquid to effect ultrasonic cleansing of the glass substrate; and Step 5: conveying the glass substrate that has been cleansed out of the cleansing tank with the glass substrate out-feeding conveyor.

The cleansing tank has two opposite side walls to which the plurality of first ultrasonic frequency generators and the plurality of second ultrasonic frequency generators are mounted. The two opposite side walls of the cleansing tank are substantially parallel to a conveyance direction of the glass substrate.

The plurality of first ultrasonic frequency generators and the plurality of second ultrasonic frequency generators are arranged in rows and are mounted, in a sequential and spaced manner, to the two opposite side walls of the cleansing tank.

The first ultrasonic frequency generators and the second ultrasonic frequency generators have frequencies that are respectively 49 kHz and 120 kHz and distance between adjacent first and second ultrasonic frequency generators is 25-50 cm.

The first ultrasonic frequency generators and the second ultrasonic frequency generators have frequencies that are respectively 68 kHz and 170 kHz and distance between adjacent first and second ultrasonic frequency generators is 15-40 cm.

In Step 3, the glass substrate is positioned in the cleansing tank to be inclined with respect to the two opposite side walls of the cleansing tank, and the glass substrate has an included angle of 30-45° with respect to a horizontal surface.

The cleansing liquid is deionized water.

The efficacy of the present invention is that the present invention provides a method for cleansing glass substrate of TFT-LCD, in which ultrasonic frequency generators of different frequencies are provided in a cleansing tank in such a way that the ultrasonic frequency generators of each frequency effect cleansing and removal of particles having sizes within a specific range so that changing cleansing tanks is not needed, the time period of cleansing process is shortened, and the cost is saved. Further, the glass substrate of TFT-LCD is positioned inclined with respect to the ultrasonic frequency generators so that particles attached to the glass substrate of TFT-LCD can be more effectively removed.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
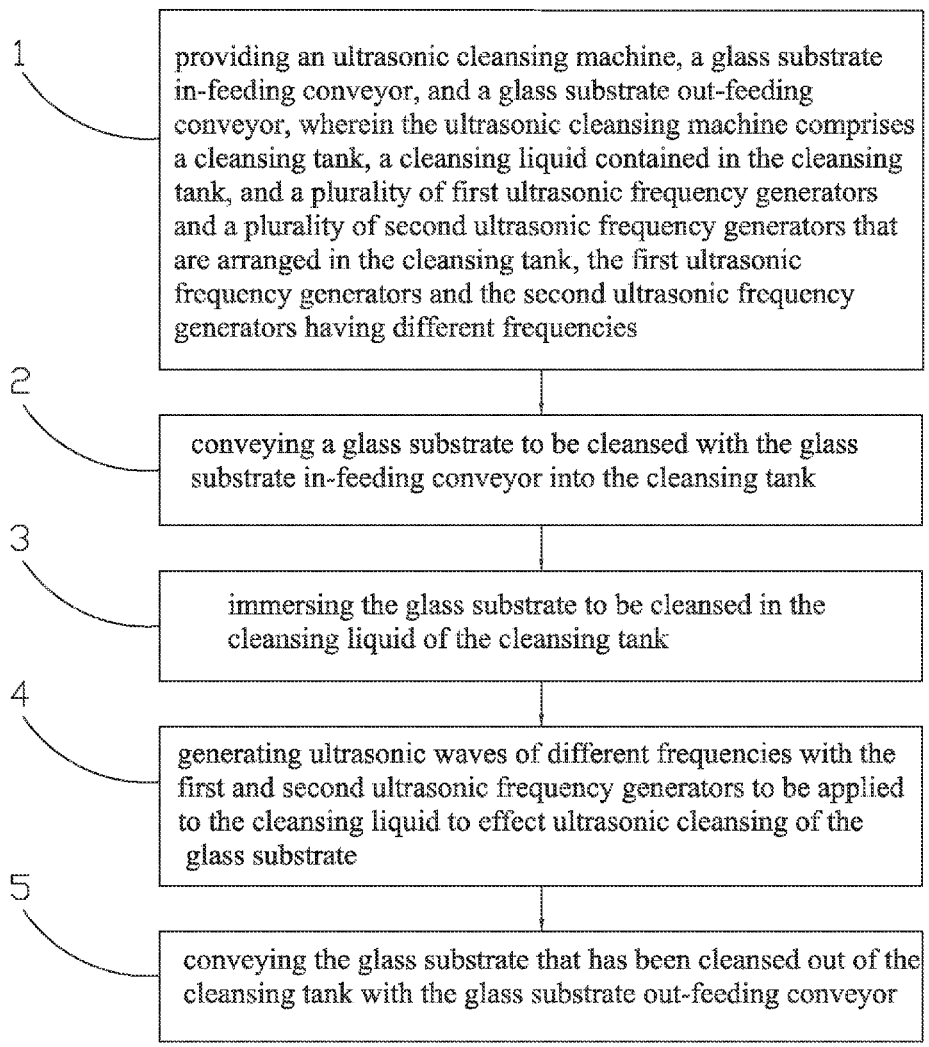
FIG. 1 is a flow chart showing a method for cleansing a glass substrate of a TFT-LCD according to the present invention.
Figure 2:
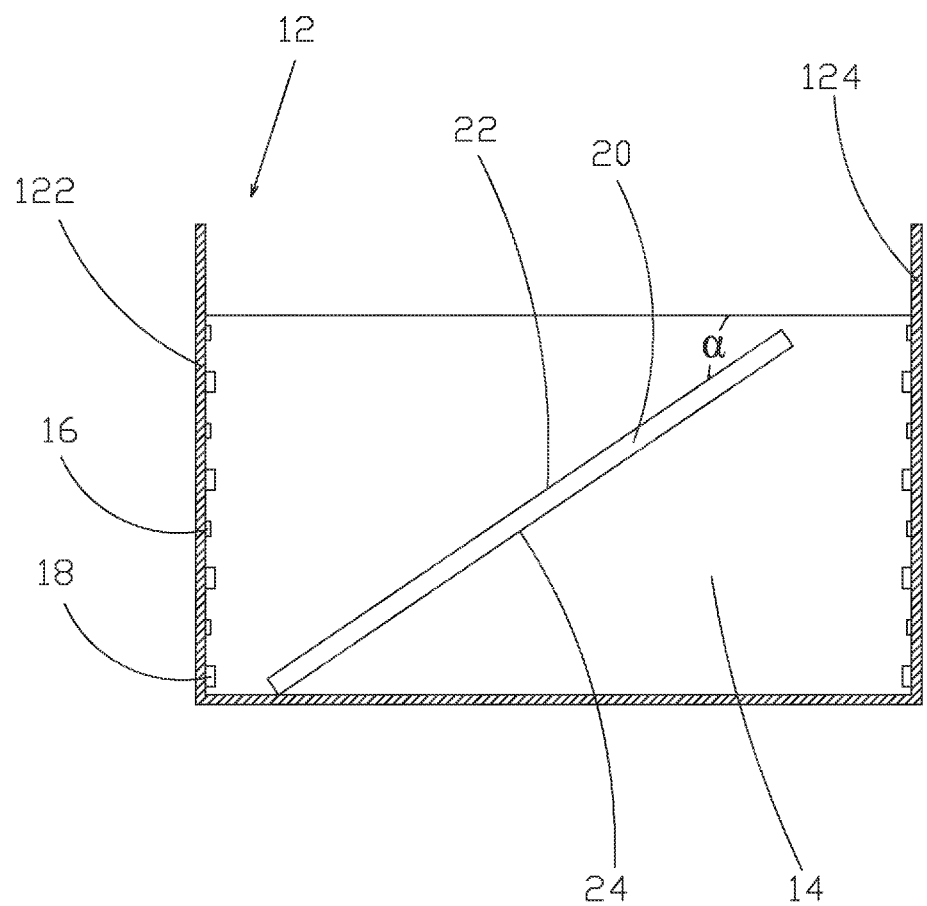
FIG. 2 is a schematic view showing an arrangement of spatial relationship among various devices that are used in the method for cleansing a glass substrate of a TFT-LCD according to the present invention.
Figure 3:
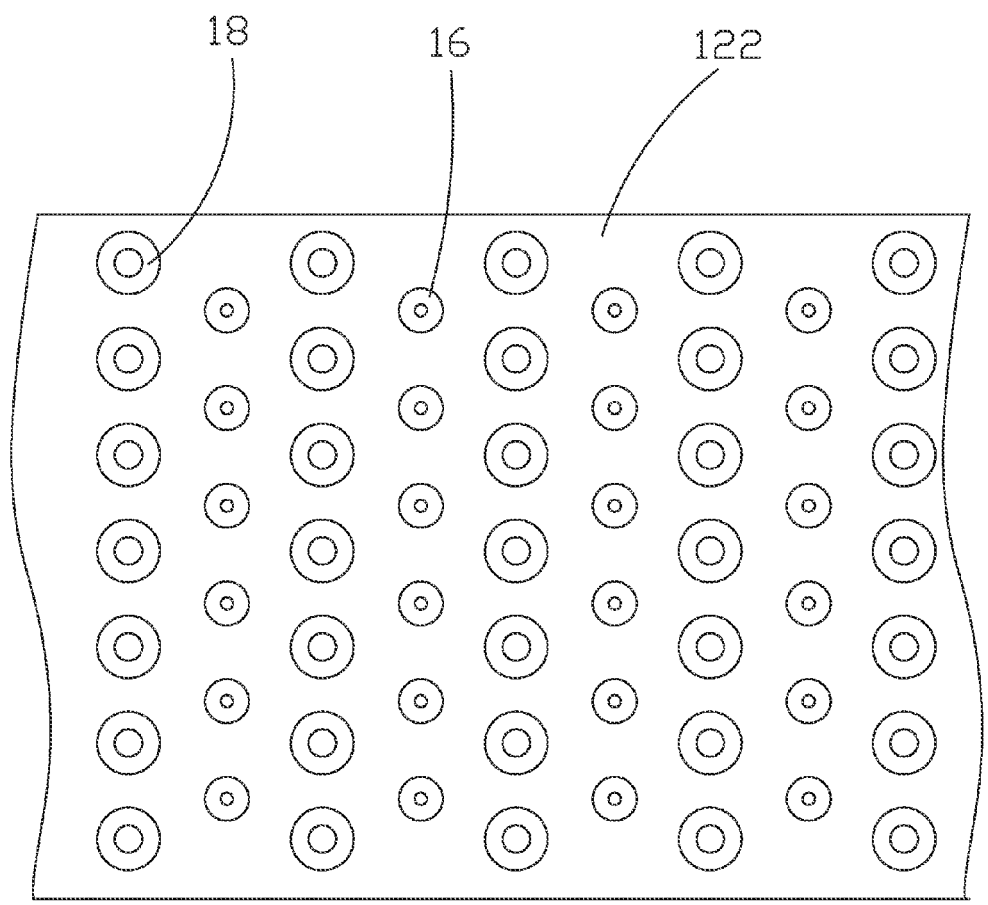
FIG. 3 is a schematic view illustrating partial arrangement of ultrasonic frequency generators on a sidewall of cleansing tank of FIG. 2.

Referring to FIG. 1, in combination with FIGS. 2-3, the present invention provides a method for cleansing a glass substrate of a TFT-LCD (Thin-Film Transistor Liquid Crystal Display), which comprises the following steps:

Step 1: providing an ultrasonic cleansing machine, a glass substrate in-feeding conveyor (not shown), and a glass substrate out-feeding conveyor (not shown).

The ultrasonic cleansing machine comprises a cleansing tank 12, a cleansing liquid 14 contained in the cleansing tank 12, and a plurality of first ultrasonic frequency generators 16 and a plurality of second ultrasonic frequency generators 18 that are arranged in the cleansing tank 12. In the instant embodiment, the cleansing liquid 14 is deionized water. The first ultrasonic frequency generators 16 and the second ultrasonic frequency generators 18 have different frequencies. The cleansing tank 12 has two opposite side walls 122, 124 to which the first and second ultrasonic frequency generators 16, 18 are mounted. The two opposite side walls 122, 124 of the cleansing tank 12 are substantially parallel to the direction along which a glass substrate 20 is conveyed. The plurality of first ultrasonic frequency generators 16 and the plurality of second ultrasonic frequency generators 18 are arranged in rows and are mounted, in a sequential and spaced manner, to the two opposite side walls 122, 124 of the cleansing tank 12 that are parallel to the conveyance direction of the glass substrate 2. The spacing distance between adjacent first and second ultrasonic frequency generators 16, 18 is 15-50 cm.

Step 2: conveying a glass substrate 20 to be cleansed with the glass substrate in-feeding conveyor into the cleansing tank 12. The glass substrate 20 can be a glass substrate of TFT-LCD.

Step 3: immersing the glass substrate 20 to be cleansed in the cleansing liquid 14 of the cleansing tank 12. The glass substrate 20 is positioned in the cleansing tank 12 in such a way of being inclined with respect to the two opposite side walls of the cleansing tank 12. In other words, the glass substrate 20 to be cleansed is positioned in the cleansing tank 12 to be inclined with respect to the first and second ultrasonic frequency generators 16, 18. The included angle α of the glass substrate 20 with respect to the horizontal surface is around 30-45°. The glass substrate 20 to be cleansed has opposite surfaces 22, 24 to be cleansed. The surfaces-to-be-cleansed 22, 24 are inclined with respect to the two opposite side walls 122, 124 of the cleansing tank 12 so that the particles that are attached to the surfaces-to-be-cleansed 22, 24 of the glass substrate 20 show a predetermined angle with respect to the direction of generation of ultrasonic waves in a direction normal to the glass substrate 20 in order to facilitate the generation of ultrasonic cavitation for improving the extent of cleansing.

Step 4: generating ultrasonic waves of different frequencies with the first and second ultrasonic frequency generators 16, 18 to be applied to the cleansing liquid 14 to effect ultrasonic cleansing of the glass substrate 20. The frequencies of the first and second ultrasonic frequency generators 16, 18 can respectively be 40 kHz and 120 kHz. The distance between adjacent first and second ultrasonic frequency generators 16, 18 is preferably 50 cm. The first and second ultrasonic frequency generators 16, 18 respectively generate ultrasonic waves of 40 kHz and 120 kHz that are applied to the cleansing liquid 14 to carry out ultrasonic cleansing of the glass substrate 20. The ultrasonic wave of frequency 40 kHz is primarily for removing particles having a size of 2.2-2.5 µm, while the ultrasonic wave of frequency 120 kHz is for removing particles having a size of 1.4-1.8 µm. Alternatively, the first and second ultrasonic frequency generators 16, 18 may be ultrasonic frequency generators respectively having frequencies of 68 kHz and 170 kHz. The distance between adjacent first and second ultrasonic frequency generators 16, 18 is preferably 15-40 cm, wherein the ultrasonic wave of frequency 68 kHz is primarily for removing particles having a size of 2.0-2.2 µm, while the ultrasonic wave of frequency 170 kHz is for removing particles having a size of 1.0-1.28 µm. By applying ultrasonic waves of different frequencies to remove particles of specific sizes can improve the result of cleansing.

Step 5: conveying the glass substrate 20 that has been cleansed out of the cleansing tank 12 with the glass substrate out-feeding conveyor.

In summary, the present invention provides a method for cleansing a glass substrate of a TFT-LCD, in which ultrasonic frequency generators of different frequencies are provided in a cleansing tank in such a way that the ultrasonic frequency generators of each frequency effect cleansing and removal of particles having sizes within a specific range so that changing cleansing tanks is not needed, the time period of cleansing process is shortened, and the cost is saved. Further, the glass substrate of a TFT-LCD is positioned inclined with respect to the ultrasonic frequency generators so that particles attached to the glass substrate of TFT-LCD can be more effectively removed.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for cleansing a glass substrate of a TFT-LCD (Thin-Film Transistor Liquid Crystal Display), comprising the following steps:
    Step 1: providing an ultrasonic cleansing machine, a glass substrate in-feeding conveyor, and a glass substrate out-feeding conveyor, wherein the ultrasonic cleansing machine comprises a cleansing tank, a cleansing liquid contained in the cleansing tank, and a plurality of first ultrasonic frequency generators and a plurality of second ultrasonic frequency generators that are arranged in the cleansing tank, the first ultrasonic frequency generators and the second ultrasonic frequency generators having different frequencies;

Step 2: conveying a glass substrate to be cleansed with the glass substrate in-feeding conveyor into the cleansing tank;

Step 3: immersing the glass substrate to be cleansed in the cleansing liquid of the cleansing tank;

Step 4: generating ultrasonic waves of different frequencies with the first and second ultrasonic frequency generators to be applied to the cleansing liquid to effect ultrasonic cleansing of the glass substrate; and Step 5: conveying the glass substrate that has been cleansed out of the cleansing tank with the glass substrate out-feeding conveyor;

wherein the cleansing tank has two opposite side walls to which the plurality of first ultrasonic frequency generators and the plurality of second ultrasonic frequency generators are mounted, the two opposite side walls of the cleansing tank being substantially parallel to a conveyance direction of the glass substrate; and wherein the plurality of first ultrasonic frequency generators is arranged in multiple first ultrasonic frequency generator rows and the plurality of second ultrasonic frequency generators is arranged in multiple second ultrasonic frequency generator rows, the multiple first ultrasonic frequency generator rows and the multiple second ultrasonic frequency generator rows being mounted to the opposite side walls to alternate each other in a direction parallel to the conveyance direction of the glass substrate, the first ultrasonic frequency generators of each of the multiple first ultrasonic frequency generator rows being alternate with the second ultrasonic frequency generators of each of the multiple second ultrasonic frequency generator rows in a direction perpendicular to the conveyance direction of the glass substrate.

2. The method for cleansing a glass substrate of a TFT-LCD as claimed in claim 1, wherein the first ultrasonic frequency generators and the second ultrasonic frequency generators have frequencies that are respectively 49 kHz and 120 kHz and distance between adjacent first and second ultrasonic frequency generators is 25-50 cm.

3. The method for cleansing a glass substrate of a TFT-LCD as claimed in claim 1, wherein the first ultrasonic frequency generators and the second ultrasonic frequency generators have frequencies that are respectively 68 kHz and 170 kHz and distance between adjacent first and second ultrasonic frequency generators is 15-40 cm.

4. The method for cleansing a glass substrate of a TFT-LCD as claimed in claim 1, wherein in Step 3, the glass substrate is positioned in the cleansing tank to be inclined with respect to the two opposite side walls of the cleansing tank, the glass substrate having an included angle of 30-45° with respect to a horizontal surface.

5. The method for cleansing a glass substrate of a TFT-LCD as claimed in claim 1, wherein the cleansing liquid is deionized water.

* * * * *